M. L. WILLIAMS.
TRANSMISSION GEARING FOR AUTOMOBILES.
APPLICATION FILED FEB. 12, 1906.
926,797.
Patented July 6, 1909.
2 SHEETS—SHEET 2.
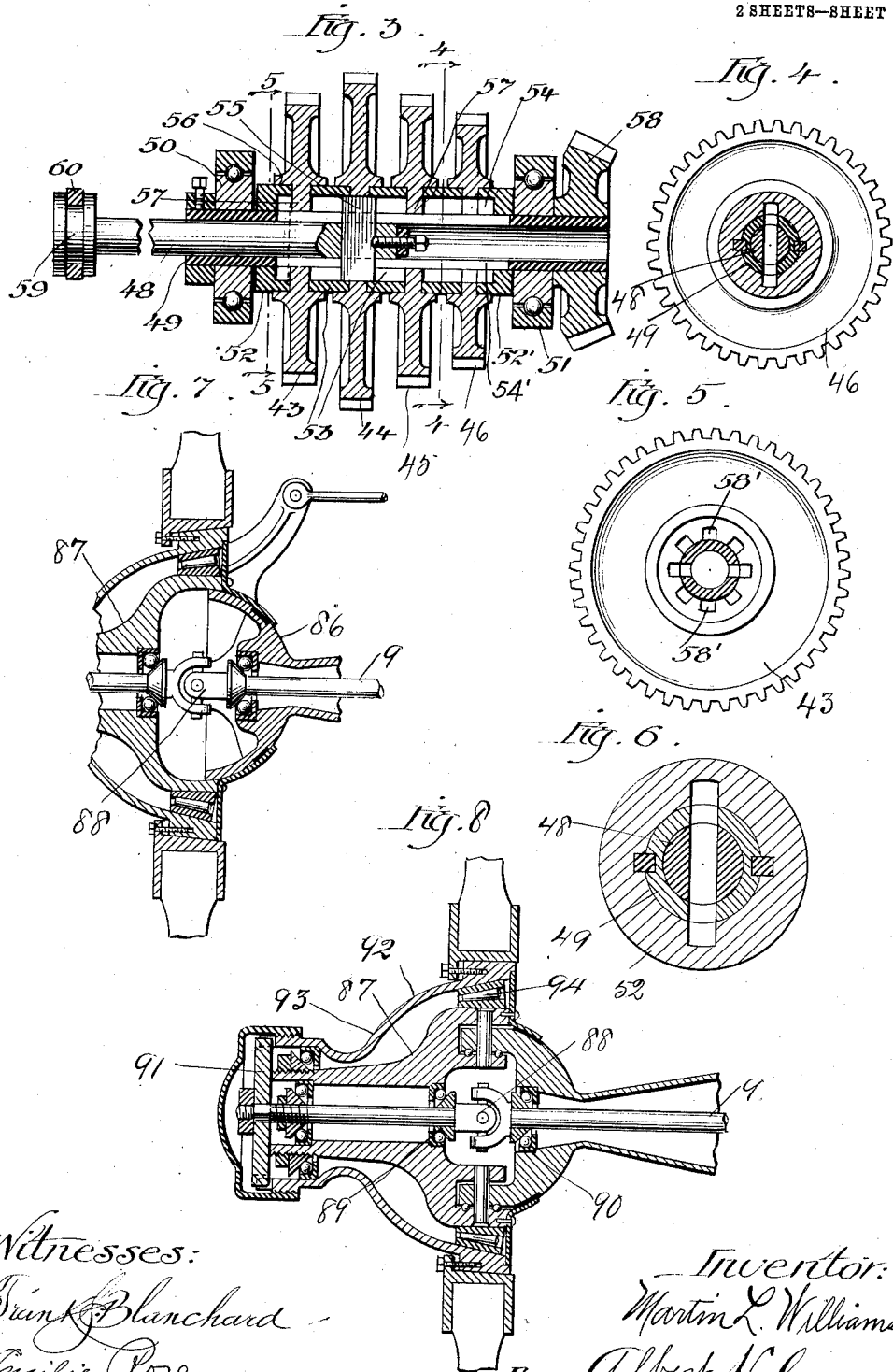

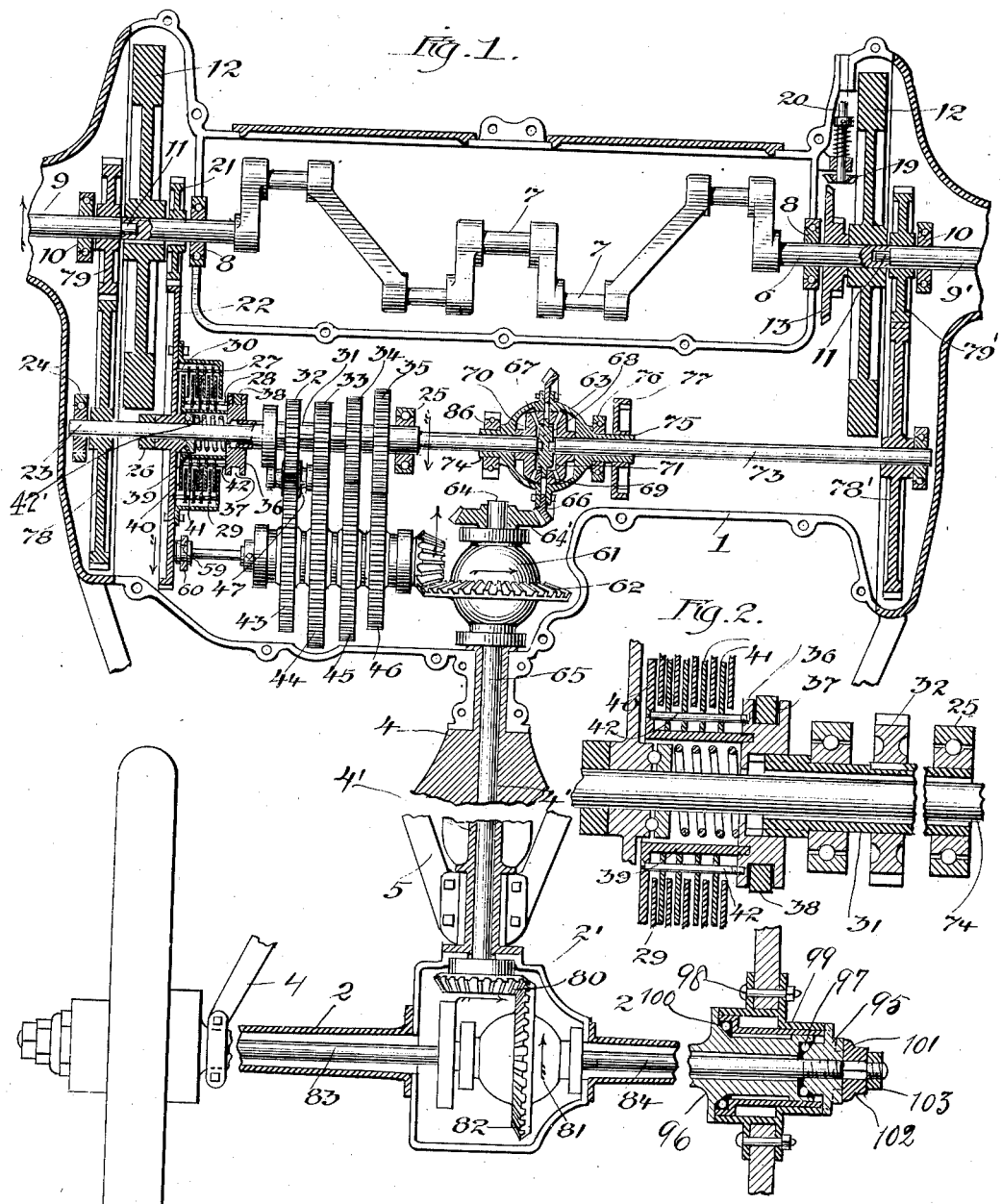
M. L. WILLIAMS.
TRANSMISSION GEARING FOR AUTOMOBILES.
APPLICATION FILED FEB. 12, 1906.
926,797.
Patented July 6, 1909.
2 SHEETS—SHEET 1.

UNITED STATES PATENT OFFICE.

MARTIN L. WILLIAMS, OF SOUTH BEND, INDIANA.

TRANSMISSION-GEARING FOR AUTOMOBILES.

No. 926,797.     Specification of Letters Patent.     Patented July 6, 1909.

Application filed February 12, 1906. Serial No. 300,555.

*To all whom it may concern:*

Be it known that I, MARTIN L. WILLIAMS, a citizen of the United States, residing at South Bend, in the county of St. Joseph and State of Indiana, have invented certain new and useful Improvements in Transmission-Gearing for Automobiles, of which the following is a specification.

This invention relates to improvements in transmission gearing for automobiles, and among the salient objects of the invention are to provide a mechanism in which all four wheels of a four-wheeled vehicle are driven so as to become traction wheels; to provide in a mechanism of the character referred to an arrangement of differential gears which secures at all times a practical equalization of the driving moment imparted to each of the four driven wheels; to provide a mechanism so constructed and arranged that it may be entirely housed in the running gear frame of the vehicle; to provide in conjunction with such a mechanism an improved change-speed mechanism; to provide an improved arrangement of the parts which permits perfect freedom of oscillatory movement of the front and rear axles of the vehicle independently of each other and without bringing stresses or increased frictional bearing upon the transmission gearing; and in general to provide a simple and improved mechanism of the character referred to.

The invention consists in the matters hereinafter described, and more particularly pointed out in the appended claims.

The invention will be readily understood from the following description, reference being had to the accompanying drawings, in which—

Figure 1 is a horizontal sectional view of a vehicle equipped with my improved transmission mechanism; parts being broken away to reduce the size of the drawing and certain parts being shown in plan view; Fig. 2 is an enlarged detail of the central portion of the friction clutch mechanism and connected parts; Fig. 3 is a detail axial sectional view of the change-speed mechanism; Figs. 4 and 6 are cross sectional views taken on lines 4—4 and 5—5, respectively, of Fig. 2; Fig. 5 is a sectional view taken on the indirect line 5—5 of Fig. 3; Fig. 7 is a horizontal axial view of the hub portion of one of the forward traction wheels of the vehicle; Fig. 8 is a vertical axial view of the same.

Referring to the drawings, and first describing generally the running gear or frame of the vehicle within which the transmission gear is mounted, 1 designates as a whole the front axle member, which is made in the form of a hollow casing and serves to house the chief parts of the motor mechanism and transmission gear.

2 designates the rear axle, which is likewise of hollow or shell-like construction, and 4 and 5, respectively, designate two V-shaped extension frames, rigidly connected with the rear and front axle frame structures, respectively, arranged in overlapped relation to each other, and having their apex portions connected, the one with the central portion of the rear axle and the other with the central portion of the front axle structure.

The front or housing axle, as shown is so constructed that the chief part of the upper half thereof is removable from the lower half, the latter part only being shown and consisting of a trough-like receptacle within which the transmission mechanism is mounted.

Describing now more particularly the transmission mechanism, 6 designates as a whole the main shaft, which is provided intermediate its length with a plurality of crank-shafts 7 and has its alined ends journaled in suitable bearings 8 upon the lower half shell of the axle. 9 and 9', respectively, designate the front axle shafts, which are each mounted in suitable bearings 10 to extend in axial alinement with the ends of the main shaft, and in order that said main shaft and axle shafts may reciprocally support each other, each axle shaft is provided with a reduced cylindric extension 11 which engages and fits within a corresponding bearing recess in the end of the main shaft. The main shaft desirably carries a fly-wheel 12 at each end, keyed or otherwise secured thereon. At one end the main shaft is provided with a starting gear 13 with which is adapted to coöperate a bevel-gear 19 mounted upon the end of a crank-shaft 20; these parts being of usual and well known construction. Upon one end of the main shaft is keyed or otherwise rigidly secured a driving-gear 21 which meshes with a larger gear 22 journaled upon a differential-shaft 23, which is suitably supported in bearings 24 and 25. The gear 22 has rigidly connected therewith the driving member of a friction clutch and will therefore be hereinafter referred to as the clutch-gear.

Describing the clutch mechanism, the gear 22 is confined against endwise movement on shaft 23 by means of a collar 26 fixed upon the shaft. Upon the gear 22 is mounted a cylindric casing 27, arranged concentric with the differential shaft and provided with an axial opening 28. Within said casing is arranged a series of washer-like friction disks 29, the exterior diameters of which are slightly less than the interior diameters of the casing 27. These disks are held against rotative movement within the casing by means of a plurality of through-pins 30 extending through the disks, through the body of the gear 22 and through the side of the casing 27 in parallelism with the differential shaft and at angularly separated points. These friction disks are freely shiftable upon the supporting pins 30.

Upon the differential shaft 23 is mounted a sleeve 31 which carries a series of gears, as 32, 33, 34 and 35, rigid therewith. The sleeve is essentially a counter shaft free to rotate upon the shaft 23 independently of the rotation of the latter. Upon the end of the sleeve 31 adjacent to the clutch casing 27 is shiftably splined a clutch member 36 provided with a peripheral groove 37 which is engaged by the fork of a clutch lever 38. The member 36 carries rigidly connected therewith, and arranged concentrically with its axis, a sleeve 39 which extends inwardly through the central openings of the friction disks 29 and is provided at its inner end with a radial outturned flange 40 which overlaps the innermost one of the series of disks 29. Interposed between the friction disks 29 are coöperating friction disks 41, which are connected positively to the clutch member 36 by means of a plurality of through-pins 42 seated in the clutch member, extending through suitable openings in the disks and through the radial flange 40. These disks are similarly shiftable upon the supporting pins 42, from which it follows that if the clutch member 36 be bodily shifted in a direction away from the clutch gear 22 the two internested sets of friction disks will be clamped into frictional engagement with each other and the movement of rotation of the clutch gear imparted to the clutch member 36 and through the latter to the gear sleeve and gears 32, 33, 34 and 35. A coiled expansion spring 42' interposed between gear 22 and clutch member 36 normally holds the disks in driving engagement. The set of gears mentioned respectively actuate a second set of gears, designated 43, 44, 45 and 46; the first of these being the reversing gear and being actuated through an intermediate idler gear 47. The two sets of gears are constantly in operative engagement with each other but are so controlled that only one pair is at any time in driving connection.

Referring to Figs. 3 to 6, inclusive, the change-speed gears 43 et seq. are shown in detail together with the mechanism whereby they are controlled. 48 designates a clutch shaft rotatably and shiftably mounted within a sleeve 49, designated in some of the claims as a shaft and which is in turn mounted in suitable bearings 50 and 51. The sleeve 49 is by its bearings confined against endwise movement, and upon said sleeve are rigidly keyed a series of hubs, 52, 53 and 52'. The sleeve 49 is provided with diametrically opposite longitudinally extending slots 54, 54' through which is arranged to extend a clutch key 55 mounted in and extending through the inner end of the clutch shaft 48. The ends of the clutch key project outside of the sleeve a short distance at each side thereof and each of the hubs 52, 53, et seq., is provided with slots arranged in register with the slots of the sleeve so that the clutch shaft and its key may be shifted endwise throughout the length of the series of hubs. The gears 43 et seq. are journaled upon the series of hubs; each gear being journaled upon and between an adjacent pair of hubs, as shown clearly in Fig. 3. That is to say, each gear is centrally recessed to provide a pair of journal shoulders 56 which fit upon the corresponding parts of the hubs; the central web-like portions 57 of the gears extending between the adjacent hubs and into proximity to the sleeve 49. Each gear is provided with a plurality of pairs of keyways 58' (see Fig. 5) through which the clutch-key may pass and with which the clutch-key may be engaged to lock the gear to rotate positively with the clutch-sleeve. Obviously the clutch-shaft may be shifted to lock any one of the gears upon the sleeve, the remaining gears being free to rotate idly. The sleeve 49 is provided with a bevel-gear 58 keyed upon its end, and at the remote end shaft 48 carries a shift-collar 59 whereby it is manipulated. The fork 60 of a shipping-lever serves to actuate the clutch-shaft. The gear 58 is arranged to intermesh with a second bevel-gear 62 which forms one member of a differential gear mechanism designated as a whole 61. This differential gear mechanism may be of any suitable construction, that shown being constructed substantially like a second differential gear mechanism, designated as a whole 63, now to be described, but it is to be noted that the gear 62 imparts driving moment to two shaft sections, one at either side thereof and designated, respectively, 64 and 65. The shaft 64 has rigidly mounted thereon a bevel-gear 64' which meshes with a second bevel gear 66 of the differential mechanism 63. Gear 66 is provided with a hollow spherical hub 67 bisected by a supporting member 68 and journaled in this supporting member are planet pinions 69 which transmit motion to the usual pair of differential gears 70 and 71 arranged at either side thereof; the gear 70 is mounted upon and actuates the counter-shaft 23 hereinbefore described, while the gear 71 is mounted upon and drives an extension counter-shaft or differential shaft 73. The gear 66 has axial sleeve extensions 74 and 75 which are journaled in bearings 76; one of these extensions being desirably provided with a brake disk 77.

The front axle shaft 9 and 9' hereinbefore described are driven from the counter shaft 23 and extension counter shaft 73, respectively, by means of pairs of spur gears 78, 79 and 78', 79'.

The front axles terminate in yoke-like enlargements 86, as best seen in Figs. 7 and 8, and upon these yokes are pivotally mounted spindle members 87 adapted to oscillate upon a vertical axis. The axle shaft, in order to afford such oscillatory movement, is provided at a point coincident with the pivotal axis of the wheel with a universal joint 88, and the shaft sections are supported in bearings at each side of the universal joint, as indicated at 89 and 90. The terminal portion of the shaft section carries a clutch disk 91 which at its periphery engages the hub shell 93 of a wheel designated as a whole 92. The wheel is journaled upon the exterior of the larger portion of the spindle member 87; an annular set of roller bearings 94 being interposed between these members.

The differential shaft section 65 extends rearwardly through a tubular reach member 4' of the truss frame 4 hereinbefore described, and at its rear end extends within a casing 2' forming a central enlargement of the hollow rear axle member 2. Upon this end of the shaft 65 is fixed a bevel-gear 80 which intermeshes with the main gear 82 of a differential gear mechanism, designated as a whole 81, shown as constructed like the differential gear mechanism 63 just described. This differential gear mechanism 81 drives the two rear axle drive shafts 83 and 84, respectively.

The terminal portions of the axle shafts 83 and 84 carry cone members 95, which fit within the outer end of spindle members 96 upon the ends of the respective axle members 2; roller bearings being interposed between these parts, as indicated at 97. The cone members 95 at their outer peripheries interlock with, and are rigidly united to, the hub shells 99 of wheels designated as a whole 98; the inner ends of the wheel hubs being journaled upon the exteriors of the spindles 96, as indicated at 100. The members 95 are made rigid with their respective axle shafts by means of clutch nuts 101 fitted upon squared portions of the shafts, as indicated at 102; these clutch nuts being held in position by means of axle nuts 103.

It will be seen from the foregoing description that I accomplish the several objects of the invention hereinbefore stated and provide a mechanism which is compactly arranged and fully housed as to all of its parts. It will be obvious that the total distance traveled by the rear wheels, measured along the tread marks of the wheels, will be different from that traveled by the front wheels, and in the absence of the provision of a differential or equalizing mechanism there would be a constant loss of traction power. My present invention completely equalizes the power transmitted to all four of the traction wheels and accomplishes this in an extremely simple and practical manner. The arrangement of the transmission mechanism is such that rising and falling movements of the several traction wheels do not in any wise bring about cramping strains upon the transmission mechanism, nor does the steering movement of the steering wheels affect said mechanism.

From the foregoing it will be understood that the details of construction and arrangement may be modified without departing from the spirit of the invention.

I claim as my invention:

1. In a transmission gearing for four-wheeled vehicles, a pair of oppositely disposed traction wheels, a second pair of similarly disposed traction wheels, a main shaft in alinement with the axes of said first pair of traction wheels, a counter shaft parallel to said main shaft, operative connections between the main and counter shafts, and driving connections between said counter shaft and both pairs of traction wheels.

2. In a transmission gearing for four-wheeled vehicles, a pair of oppositely disposed traction wheels, a second pair of similarly disposed traction wheels, a main shaft in alinement with the axes of said first pair of traction wheels, a counter shaft parallel to said main shaft, operative connections between said counter shaft and main shaft, a differential shaft operatively connected with each of said first pair of traction wheels, driving connections including a differential gear mechanism between said counter shaft and said differential shaft, driving connections between said differential gear mechanism and said second pair of traction wheels, said latter driving connections also including a differential mechanism.

3. In a transmission mechanism for four-wheeled vehicles, a pair of oppositely disposed traction wheels, a second pair of similarly disposed traction wheels, a main shaft, a counter shaft, operative connections including a friction clutch mechanism interposed between said main shaft and counter shaft, driving connections between said counter shaft and the respective pairs of traction wheels, said connections including a differential gear mechanism whereby said respective pairs of wheels are driven independently of each other.

4. In a transmission mechanism for four-wheeled automobiles, the combination of rear and front traction wheels, of a main shaft, a counter shaft, driving connections between the main shaft and counter shaft, a parallel shaft, a change-speed mechanism arranged for variably driving the parallel shaft from the counter shaft, a first differential gear mechanism, to the main center gear of which said parallel shaft is geared, a second differential gear mechanism, driving connections between one side of said first differential gear mechanism and the main center gear of said second differential gear mechanism, driving connections between the respective sides of said second differential gear mechanism and the corresponding front traction wheels, a third differential gear mechanism, driving connections between one side of the first differential gear mechanism and the main center gear of said third differential gear mechanism, and driving connections between the respective sides of said third differential gear mechanism and the corresponding rear traction wheels.

5. In a transmission mechanism for four-wheeled automobiles, the combination front and rear traction wheels, of a main shaft, a counter shaft parallel with said main shaft, driving connections between the main shaft and counter shaft, a parallel shaft, a change-speed mechanism arranged for variably driving the parallel from the counter shaft, a first differential gear mechanism, to the main or center gear of which said parallel shaft is operatively connected, a second differential gear mechanism, driving connections between one side of said first differential gear mechanism and the main or center gear of said second differential gear mechanism, driving connections between the respective sides of said second differential gear mechanism and the corresponding front traction wheels, a third differential gear mechanism, driving connections between that side of the front differential gear mechanism opposed to the side which drives the second differential gear mechanism and the main or center gear of said third differential gear mechanism, and driving connections between the respective sides of the latter differential gear mechanism and the corresponding rear traction wheels.

6. In a transmission mechanism for four-wheel driven automobiles, the combination of front and rear traction wheels, of a main shaft, a counter shaft parallel therewith, driving connections between the main shaft and counter shaft said connections including a friction clutch mechanism, a parallel shaft, a change-speed mechanism transmitting power from the counter shaft to the parallel shaft comprising a series of gears fixed on the counter shaft, a corresponding and intermeshing series of gears journaled on the parallel shaft, the latter being hollow or of sleeve-like construction, a clutch mechanism operable to clutch any one of the gears upon the parallel shaft rigidly rotatable therewith while the remaining gears rotate idly, a differential gear mechanism to the main or center gear of which said parallel shaft is geared, driving connections between one side of said differential gear mechanism and each of the front traction wheels, and driving connections between the opposite side of said differential gear mechanism and each of the rear traction wheels.

7. In a transmission mechanism for four-wheel driven automobiles, the combination of front and rear traction wheels, of a main shaft, a counter shaft parallel therewith, driving connections between the main shaft and counter shaft said connections including a friction clutch mechanism, a parallel shaft, a change-speed mechanism transmitting power from the counter shaft to the parallel shaft comprising a series of gears fixed on the counter shaft, a corresponding and intermeshing series of gears journaled on the parallel shaft, the latter being hollow or of sleeve-like construction, a clutch mechanism operable to clutch any one of the gears upon the parallel shaft rigidly rotatable therewith while the remaining gears rotate idly, a first differential gear mechanism, to the main or center gear of which said parallel shaft is operatively connected, a second differential gear mechanism, driving connections between one side of said first differential gear mechanism and the main or center gear of said second differential gear mechanism, driving connections between the respective sides of said second differential gear mechanism and the corresponding front traction wheels, a third differential gear mechanism, driving connections between that side of the front differential gear mechanism opposed to the side which drives the second differential gear mechanism and the main or center gear of said third differential gear mechanism, and driving connections between the respective sides of the latter differential gear mechanism and the corresponding rear traction wheels.

8. In a transmission mechanism for four-wheel driven automobiles, the combination of front and rear traction wheels, of a main shaft, a counter shaft parallel with the main shaft and of hollow or sleeve-like construction, driving connections between the main shaft and counter shaft, a parallel shaft, change-speed driving connections between the counter shaft and parallel shaft, a primary differential gear mechanism having its axis arranged at right angles to the parallel shaft and its center or main gear geared to the latter, a second differential gear shaft arranged in axial alinement with the counter shaft and extending through the latter, a differential gear mechanism interposed in said differential shaft, driving connections between one side of the primary differential gear mechanism and the main or center gear of the second differential gear mechanism, and driving connections between the respective ends of said differential shaft and the corresponding front traction wheels.

9. In a transmission mechanism for four-wheel driven automobiles, the combination of front and rear traction wheels, of a main shaft, a counter shaft parallel with the main shaft and of hollow or sleeve-like construction, driving connections between the main shaft and counter shaft, a parallel shaft, change-speed driving connections between the counter shaft and parallel shaft, a primary differential gear mechanism having its axis arranged at right angles to the parallel shaft and its center or main gear geared to the latter, a second differential gear shaft arranged in axial alinement with the counter shaft extending through the latter, a differential gear mechanism interposed in said differential shaft, driving connections between one side of the primary differential gear mechanism and the main or center gear of the second differential gear mechanism, and driving connections between the respective ends of said differential shaft and the corresponding front traction wheels.

10. In a transmission mechanism for four wheel driven automobiles, the combination of front and rear traction wheels, a main shaft, a counter shaft parallel with the main shaft and of hollow or sleeve-like construction, driving connections between the main shaft and counter shaft, a parallel shaft, change-speed driving connections between the counter shaft and parallel shaft, a primary differential gear mechanism having its axis arranged at right angles to the parallel shaft and its center or main gear geared to the latter, a second differential gear shaft arranged in axial alinement with the counter shaft and extending through the latter, a differential gear mechanism interposed in said differential shaft, driving connections between one side of the primary differential gear mechanism and the main or center gear of the second differential gear mechanism, driving connections between the respective ends of said differential shaft and the corresponding front traction wheels, a third differential gear mechanism, driving connections between the primary differential gear mechanism and said third differential gear mechanism, and driving connections between the respective sides of the third differential gear mechanism and the corresponding rear traction wheels.

11. In a change-speed mechanism, the combination of a sleeve provided with a longitudinally extending slot extending through its side, a clutch shaft working within said sleeve and provided with a key extending out through the slot and projecting beyond the sleeve, a series of hubs rigid upon the exterior of the slotted portion of the sleeve, and having keyways formed therethrough in register with the slot of the sleeve, a series of gears journaled upon said hubs and spaced apart and having their central portions extending inwardly alongside of the hubs, said gears having keyways formed in their inner perimeters, means for shifting and holding in shifted position the clutch shaft, and means for positively rotating the sleeve.

12. In a change-speed mechanism, the combination of a sleeve having a longitudinally extending slot formed through the side thereof, a clutch shaft working within said sleeve and provided with a key arranged to protrude through the slot of the sleeve, a series of hubs rigid upon said sleeve, a series of gears journaled upon said hubs and spaced apart, each provided with an internal keyway or slot adapted to register with the slot in the sleeve, means for shifting, and holding in shifted position, the clutch shaft, a series of gears journaled alongside of and in mesh with the corresponding gears mounted upon said sleeve, and means for positively driving the sleeve.

13. In a change-speed mechanism, the combination with a driven shaft of a series of gears of varied diameter non-rotatably mounted thereon, of a driving mechanism comprising a sleeve journaled parallel with said driven shaft and provided with a longitudinally extending slot, a clutch shaft arranged to reciprocate within said sleeve and provided with a key rigid with the shaft and arranged to protrude through the slot in the sleeve, a series of hubs rigidly mounted upon the sleeve and spaced apart, a series of gears journaled upon said hubs and spaced apart, said gears being complementary to and intermeshing with the several gears on the driven shaft, each of the gears carried by the sleeve being provided internally with a peripheral portion which extends radially inward alongside of the hub or hubs upon which it is journaled and provided in said peripheral portion with keyways adapted to receive the key of the clutch shaft, means for shifting, and holding in shifted position, the clutch shaft, and means for rotating the sleeve.

MARTIN L. WILLIAMS.

Witnesses:
FRANK L. BELKNAP,
EMILIE ROSE.